E. GUNDELACH.
FOLDING VEHICLE.
APPLICATION FILED OCT. 22, 1907.
910,372.
Patented Jan. 19, 1909.
2 SHEETS—SHEET 1.
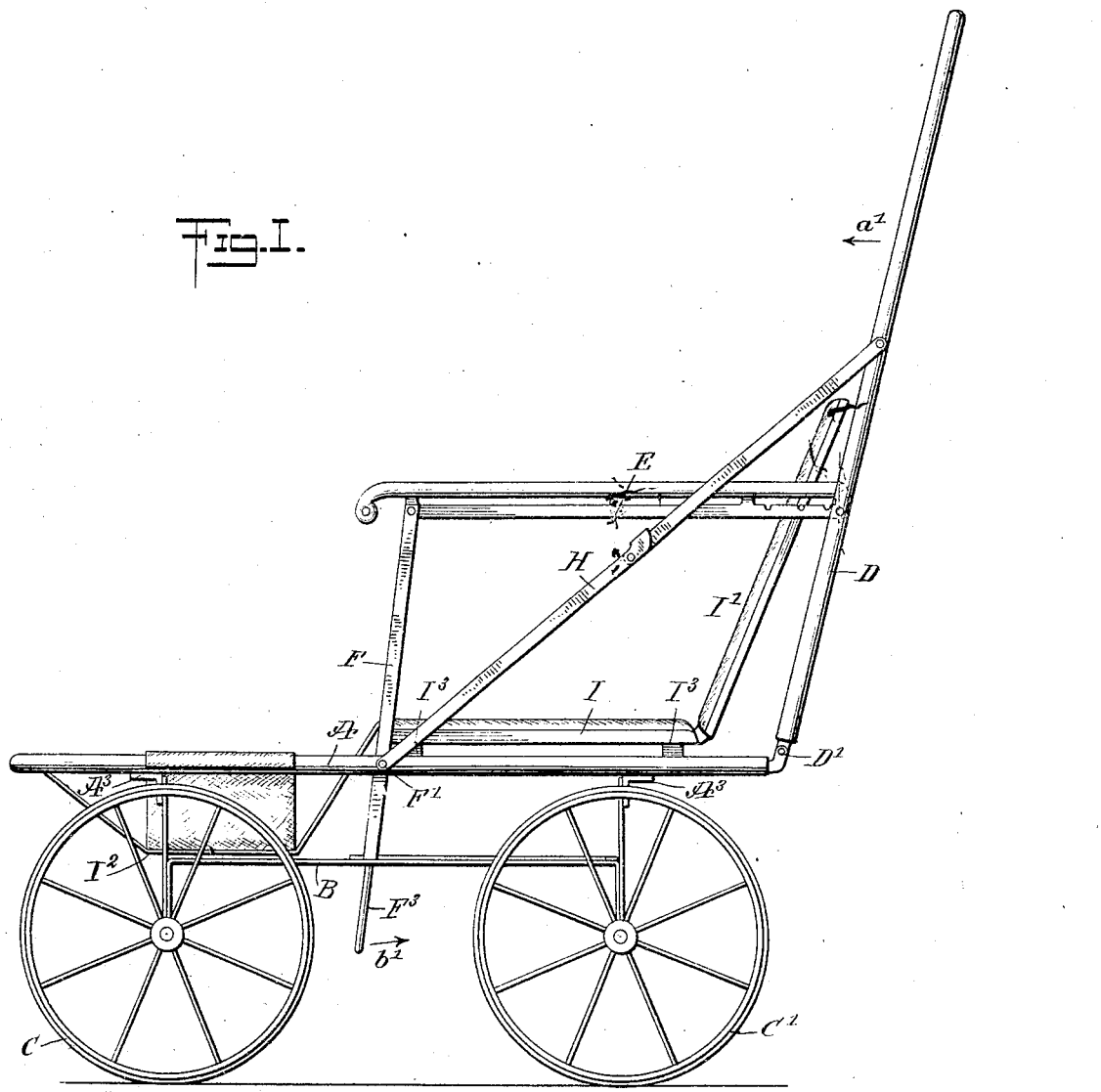
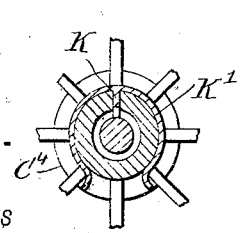
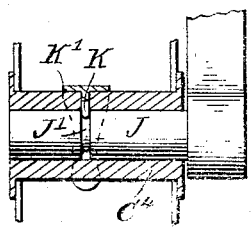
WITNESSES
G. R. Thomas
Theof. Hoosted
INVENTOR
Emil Gundelach
BY Munn & Co.
ATTORNEYS

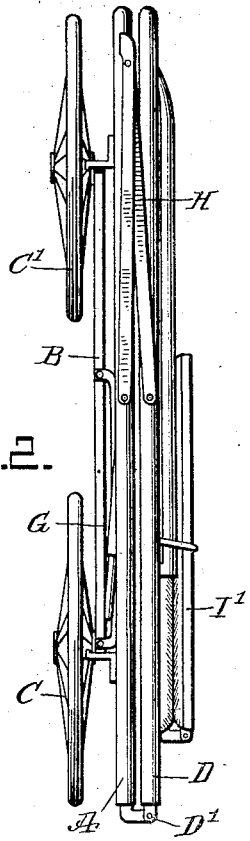
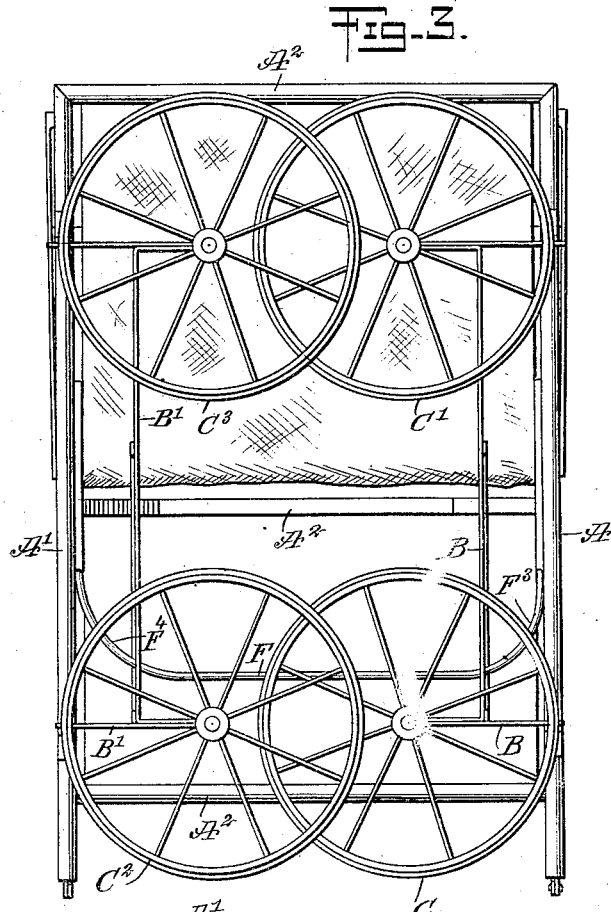
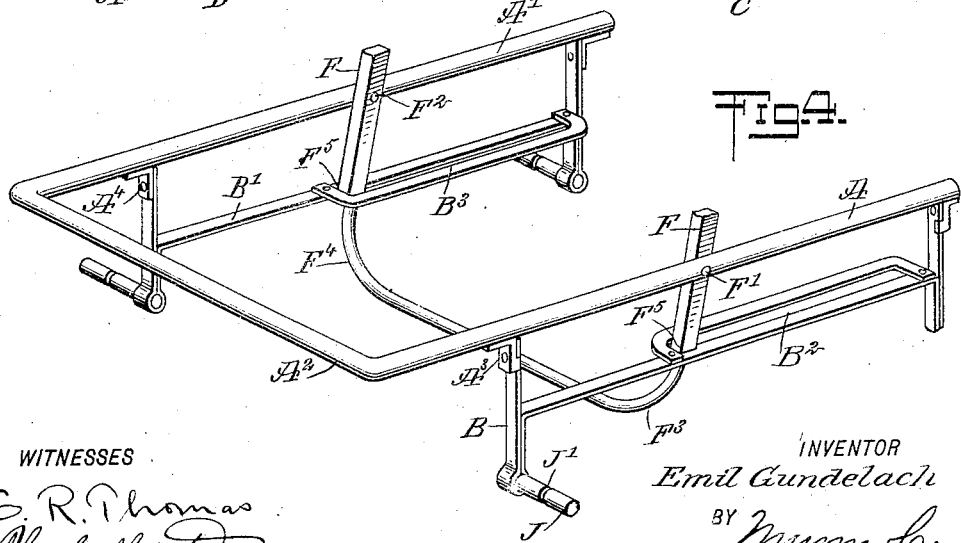

UNITED STATES PATENT OFFICE.

EMIL GUNDELACH, OF NEW ROCHELLE, NEW YORK, ASSIGNOR, BY DIRECT AND MESNE ASSIGNMENTS, TO F. A. WHITNEY CARRIAGE COMPANY, OF LEOMINSTER, MASSACHUSETTS, A CORPORATION OF MASSACHUSETTS.

FOLDING VEHICLE.

No. 910,372.

Specification of Letters Patent.

Patented Jan. 19, 1909.

Application filed October 22, 1907. Serial No. 398,542.

*To all whom it may concern:*

Be it known that I, EMIL GUNDELACH, a citizen of the United States, and a resident of New Rochelle, in the county of Westchester and State of New York, have invented a new and Improved Folding Vehicle, of which the following is a full, clear, and exact description.

The invention relates to baby carriages, go-carts and similar vehicles, such, for instance, as shown and described in the Letters Patent of the United States, No. 863,972, granted to Robert J. Ehlers on August 20, 1907.

The object of the invention is to provide a new and improved folding vehicle, arranged to permit of conveniently folding the vehicle into a small parcel, for conveniently carrying it about from place to place, and to allow extending the vehicle and securely locking the parts in the extended position whenever it is desired to use the vehicle for its legitimate purposes.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement in an extended position; Fig. 2 is a like view of the same in a folded condition; Fig. 3 is an under side view of the same; Fig. 4 is a perspective view of the bed, the pivoted wheel supports and the cam device for actuating the wheel supports; Fig. 5 is an enlarged sectional side elevation of the fastening device for holding a wheel to its axle, and Fig. 6 is a transverse section of the same.

The bed of the vehicle consists preferably of two spaced side bars A, A', connected with each other by cross bars $A^2$, so as to render the bed as rigid as possible. The wheel supports B, B' are arranged in such a manner that each carries the front and rear wheel of one side of the vehicle, that is, the wheel support B carries the front and rear wheels C, C' of the left side of the vehicle, while the wheel support B' carries the front and rear wheels $C^2$, $C^3$ of the right-hand side of the vehicle.

The wheel supports B and B' are pivoted on brackets $A^3$, $A^4$, arranged on the side bars A, A' of the bed of the vehicle, so as to allow the wheel supports B and B' to swing transversely with a view to hold the same on the under side of the bed, as indicated in Figs. 2 and 3. The wheel supports B and B' are actuated from the handle D, having the terminals of its side arms pivoted at D' on the outer ends of the side bars A and A' of the vehicle bed, and the said side arms of the handle D are pivotally connected by forwardly extending links E with the upper ends of a U-shaped lever F, fulcrumed at F' and $F^2$ on the side bars A and A', as plainly shown in Fig. 4. The lever F is provided with rounded off cam portions $F^3$, $F^4$, engaging longitudinally extending slots $B^2$, $B^3$ formed on the wheel supports B and B', so that when the several parts are in an extended position, as illustrated in Fig. 1, and the operator swings the handle D forward in the direction of the arrow $a'$, then a swinging motion is given by the links E to the lever F, to swing the cam portions $F^3$, $F^4$ rearwardly in the direction of the arrow $b'$ (see Fig. 1), whereby an inward swinging movement is given to the wheel supports B and B', to fold the latter onto the under side of the bed of the vehicle, as illustrated in Figs. 2 and 3.

By reference to Fig. 4, it will be seen that the curvature of the cam portions $F^3$ and $F^4$ is different, that is, the curvature of the cam portion $F^3$ is more steep than that of the portion $F^4$, whereby the wheel support B is swung into a folded position ahead of the wheel support B', that is, the wheel supports B and B' are swung successively into a folded position, or from the latter back into an extended position. The lever F is further provided with shoulders $F^5$, adapted to rest on the top of the wheel supports B and B' at the time the latter are in an extended position, and the lever F is inclined, as shown in Fig. 1, that is, the shoulders $F^5$ together with the cam portions $F^3$, $F^4$ are somewhat in advance of the pivots F' and $F^2$. Now by this arrangement the wheel supports B and B' and the lever F are firmly held in a locked position, to prevent accidental folding of the wheel supports while the vehicle is in use for its legitimate purpose. In order to secure the handle D, however, and consequently the lever F and the wheel supports B and B' in an extended position, sectional braces H are provided, pivotally connecting the side arms A, A' with the side arms of the handle D. The seat I of the vehicle is provided with a suitable back I' and a foot rest I², and the said seat I is preferably supported on springs I³, carried by the bed of the vehicle.

By reference to Fig. 1, it will be seen that the upper portions of the side arms of the U-shaped lever F as well as the links E, form the foldable sides of the vehicle, it being understood that the links E fold down upon the bed when the handle D is swung forward, as previously explained for folding the wheel supports B and B'. The axle J for each of the wheels C, C', C² and C³ is provided with an annular groove J', into which projects a pin K held on a spring clamp K', adapted to clamp the hub C⁴ of a vehicle wheel C, C', C² or C³. By this arrangement the vehicle wheel is held against movement in the direction of its axis, but is free to turn on the axle J, and further fastening devices, such as the nuts and collars usually employed for holding the wheel in place on an axle, are entirely dispensed with. It will also be noticed that the groove J' serves to retain the lubricant in the axle, so as to properly lubricate the wheel at all times.

Having thus described my invention, I claim as new and desire to secure by Letters Patent:

1. A folding vehicle, comprising spaced side bars, cross bars connecting the side bars, a wheel support pivoted to each side bar to swing transversely thereof, a substantially U-shape handle having the terminals of its side arms pivoted to the outer ends of the side bars, forwardly extending links pivoted to the handle, a U-shape lever having its side arms pivoted to the links, the said side arms being provided with cam portions, the wheel support having longitudinal slots through which said cam portions extend, the cam portions being shaped to swing one of the supports previous to the swinging of the other, whereby to fold the wheel supports in succession.

2. A folding vehicle comprising a bed, wheel supports mounted to swing transversely on the said bed and each carrying the wheels of one side of the vehicle, the said wheel supports having longitudinal slots, a handle mounted to swing longitudinally on the said bed, and a lever controlled by the said handle and having cam portions for engaging the said slots, one of said cam portions being more abrupt than the others whereby to operate the supports successively.

3. A folding vehicle comprising a bed, wheel supports mounted to swing transversely on the said bed and each carrying the wheels of one side of the vehicle, the said wheel supports having longitudinal slots, a handle mounted to swing longitudinally on the said bed, and a lever controlled by the said handle and having a U-shaped portion whose arms engage the respective slots, said arms being of different shape whereby to swing the wheel supports successively.

4. A folding vehicle comprising a bed, wheel supports mounted to swing transversely on the said bed and each carrying the wheels of one side of the vehicle, the said wheel supports having longitudinal slots, a handle mounted to swing longitudinally on the said bed, and a lever controlled by the said handle and having a U-shaped portion engaging the said slots, the sides of the U-shaped portion having different curvatures, to cause the said wheel supports to swing in succession into a folded or extended position relative to the said bed.

In testimony whereof I have signed my name to this specification in the presence of two subscribing witnesses.

EMIL GUNDELACH.

Witnesses:
JAMES A. GRAY,
ROBT. J. EHLERS.